United States Patent [19]
Verhelst

[11] 3,949,968
[45] Apr. 13, 1976

[54] STRETCHER FOR WIRES, ROPES AND SIMILAR FLEXIBLE ELEMENTS FOR USE IN FENCES OR SUCHLIKE

[75] Inventor: Romain Verhelst, Kortrijk, Belgium

[73] Assignee: N.V. Bekaert S.A., Zwevegem, Belgium

[22] Filed: Sept. 24, 1974

[21] Appl. No.: 508,729

[30] Foreign Application Priority Data
Oct. 23, 1973  Belgium .............................. 806383

[52] U.S. Cl. .............................................. 254/162
[51] Int. Cl.² ......................................... A63B 61/04
[58] Field of Search .......................... 254/162, 161

[56] References Cited
UNITED STATES PATENTS

| | | | |
|---|---|---|---|
| 463,475 | 11/1891 | Black | 254/161 |
| 598,494 | 2/1898 | Bennett et al. | 254/161 |
| 898,899 | 9/1908 | Keck | 254/161 |
| 1,272,944 | 7/1918 | Green | 254/161 |
| 2,643,857 | 6/1953 | Reece et al. | 254/161 |
| 3,673,642 | 7/1972 | Harwell | 254/161 X |
| 3,856,265 | 12/1974 | Foster | 254/161 |

*Primary Examiner*—M. H. Wood, Jr.
*Assistant Examiner*—Michael J. Forman
*Attorney, Agent, or Firm*—Edward J. Brenner

[57] ABSTRACT

A stretcher for stretching wires and similar elements for use in fences and the like which comprises a yoke to be attached to a post or similar element, the outer portions of the yoke being provided with two opposite apertures, and a rotatable stretching element disposed between the outerportions of the yoke and provided with a through cross-aperture in which a wire to be stretched can be received. The rotatable stretching element is provided with a threaded outer end having a cross-section smaller than the stretching element, thus forming a collar, and substantially equal to the cross-section of the aperture of associated outer portion of the yoke and an associated nut. By tightening the nut, the associated outer end portion of the yoke is gripped between the collar of the stretching element and the nut.

2 Claims, 4 Drawing Figures

STRETCHER FOR WIRES, ROPES AND SIMILAR FLEXIBLE ELEMENTS FOR USE IN FENCES OR SUCHLIKE

The invention relates to a stretcher for tightening wires, ropes or similar flexible elements, in particular for use in fences, drying racks and suchlike.

Wire stretchers are already known, provided with a rotatable stretching element on which the wire to be stretched is wound. This rotatable stretching element is generally mounted in a yoke or similar element.

The stretching element of such known wire stretchers can only be turned in one direction and is clamped, for example, every half a revolution, so that retrograde movement of the stretching element is prevented. The disadvantage of said known wire stretchers is that it is necessary to cut the wire when it is established that the wire is not stretched at the desired location or that it is to be removed.

Another disadvantage of the known wire stretchers is that first the yoke or a similar element is to be mounted at the exact spot, for example to a post. Next it is necessary to tighten the wire by means of the stretching element. This means that two separate operations are necessary.

Still another disadvantage of these known wire stretchers is that the stretching element itself cannot be attached to the outer end portions of the yoke or a similar device, since the outer end portions of the yoke are joined by means of closing elements, such as a bolt and a nut. When such a stretcher is used for tightening one end of a fence to a front post or a final post, automatically the disadvantage is obtained that it is impossible to stretch the fence closely against the fence post since the closing elements disposed at the outer end portions of the yoke prevent the fence from being drawn against the stretching element. This results in a large longitudinal aperture between the fence and said front or final post.

It is an object of this invention to provide a new type of wire stretcher, whereby the abovementioned drawbacks are fully obviated.

Therefore, it is proposed according to the invention that the stretcher comprises a yoke to be mounted around a post or a similar element, whereby the outer end portions of the yoke are provided with two opposed apertures, in which a rotatable stretching element is disposed. This stretching element is provided with a through cross-aperture in which at least one end of the wire to be stretched is secured and with a threaded outer end and an associated nut, whereby the cross-section of the threaded outer end is smaller than the cross-section of the stretching element itself and substantially equal to the cross-section of the aperture in one outer end of the yoke, so that by tightening the nut, this outer end of the yoke is gripped between the collar of the stretching element and the nut.

An important advantage of the wire stretcher according to the invention is that the stretching element and the closing elements of the yoke form one whole, so that it is possible to manufacture the wire stretcher in a more economical way.

Another important advantage is that it is always possible to detach the stretched wire. Stretching the wire is a continuous process, and is not accomplished by turning the stretching element per half a revolution or per quarter of a revolution.

Another important advantage is that stretching the wire and mounting the yoke on a post or a similar element can be carried out in one operation.

Another important advantage is that the ends of a fence can be stretched closely against the front and final post.

Still another important advantage is that the wire stretcher according to the invention constitutes a self-tensioning system, whereby no unfavorable clamping action is exerted by the yoke on the post through which the latter might be damaged. By taking care when stretching the wire that the stretching element turns counter-clockwisely and the nut is tightened clockwisely, it is obtained that the tension applied on the wire assists in further tightening the nut. In this manner, the wire is immovably tensioned. This clamping action occurs between the collar of the stretching element and the nut and not over the whole contour of the yoke. Consequently, the yoke cannot exert a damaging influence on the post, for instance by causing an undesired nick, thus damaging the coating of the post.

The invention will now be further described with the assistance of the accompanying drawings in which.

Figure 1:
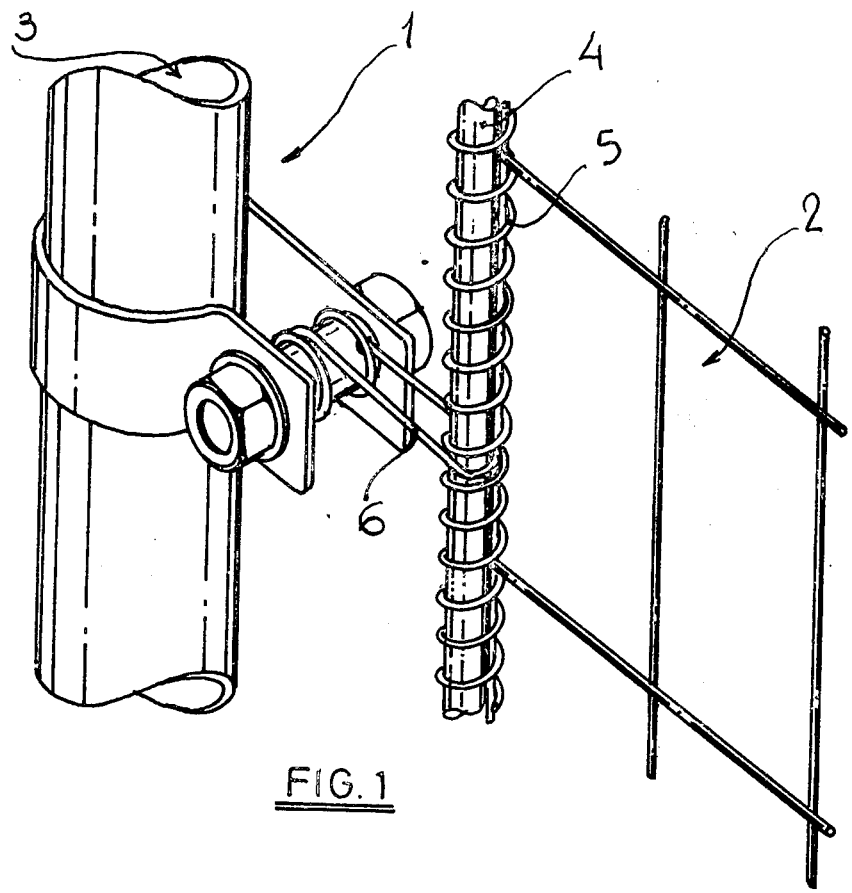
FIG. 1 is a perspective view of the attachment and the stretching of the outer end portion of a fence fabric to a post by means of a wire stretcher according to the present invention.

FIG. 1 clearly shows how by means of a wire stretcher 1 according to the invention the outer end portion of a fence fabric 2 can be attached and stretched to a post 3. The unshown outer end portion of the fence fabric 2 is already attached to a post or a similar element. The fabric 2 is preferably provided with a holding rod 4 at each end. The attachment of the fabric 2 to a holding rod 4 may happen in various manners. In the embodiment shown in FIG. 1, the holding rod 4 is attached to the fabric 2 by means of a spiral wire 5. The holding rod 4 is drawn against the wire stretcher 1 as closely as possible by means of a binding wire 6. As many wire stretchers 1 are installed on the post 3 as are thought necessary to transmit a uniform tension to the fabric 2; usually there are three to four wire stretchers 1 per meter of fabric height.

Figure 2:
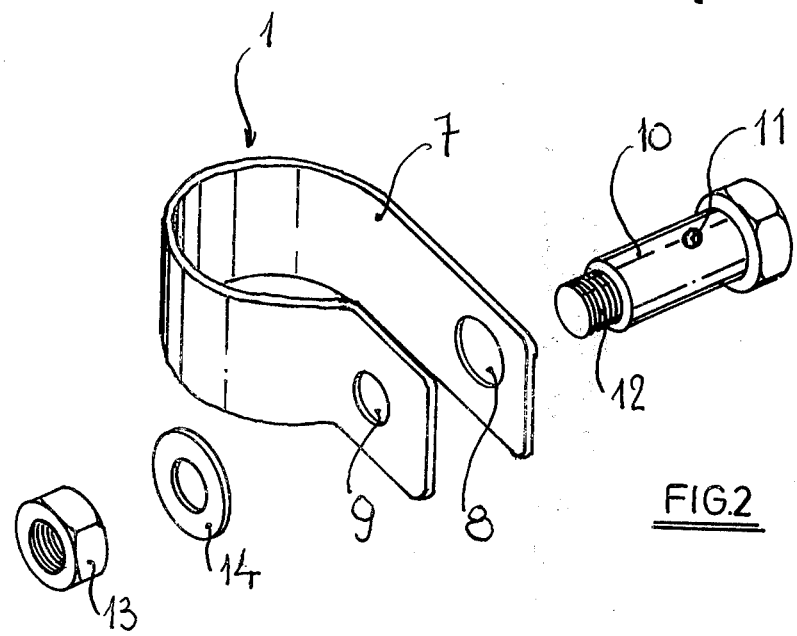
FIG. 2 is a perspective view of the different parts of the wire stretcher according to the invention.

FIG. 2 shows the various parts of a wire stretcher 1 according to the invention. The wire stretcher 1 comprises a yoke 7 for the attachment around a post 3 or a similar element. The cross-section of the yoke 7 substantially corresponds with the cross-section of the post 3. The outer ends of the yoke 7 are provided with two opposite apertures 8 and 9. A rotatable stretching element 10 is disposed in the apertures 8 and 9. The stretching element 10 has a through cross-aperture 11 in which the outer end or the outer ends of a wire to be stretched are secured, for example the binding wire 6 in FIG. 1. The stretching element 10 is also provided with a threaded outer end portion 12 with an associated nut 13 and a washer 14.

The cross-section of the threaded outer end 12 is smaller than the cross-section of the stretching element 10 itself and is substantially equal to the aperture 9 in one outer end of the yoke 7, so that by tightening the nut 13, this outer end of the yoke 7 is gripped between the collar of the stretching element 10 and the nut 13.

Figure 3:
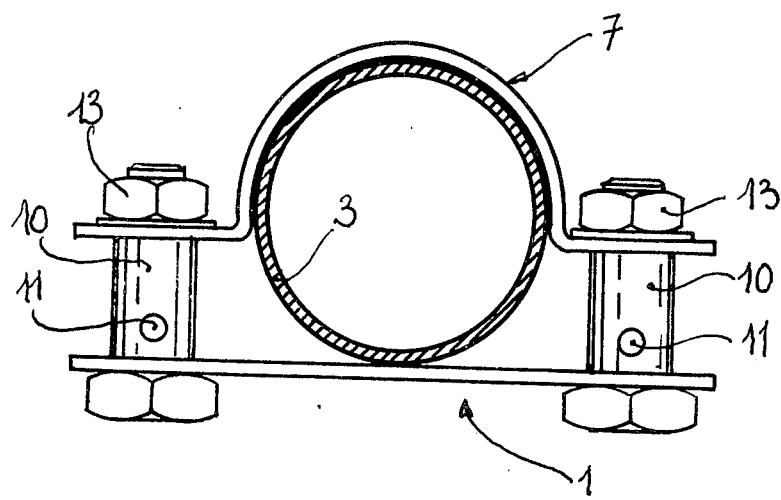
FIGS. 3 and 4 show possible variant embodiments of a wire stretcher according to the invention.
Figure 4:
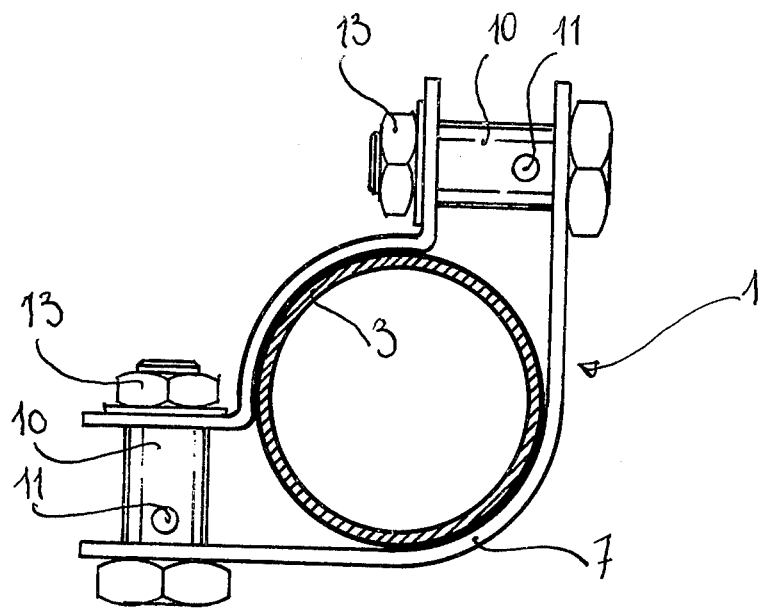

FIGS. 3 and 4 show two possible variant embodiments of a wire stretcher according to the invention. These wire stretchers are specially designed to be attached to an intermediate post (see FIG. 3) or a corner post (see FIG. 4), whereby two binding wires are to be attached to said intermediate post or corner post.

FIGS. 1 and 2 also reveal that the yoke 7 is preferably excentrically bent with respect to its outer ends. The advantage then is that the fence fabric 2 substantially forms a tangent plane to the attachment posts 3 or suchlike, so that the intermediate post, supporting posts, etc. do not hinder the attachment of the fence fabric 2 to the posts 3 by means of the wire stretchers 1 according to the invention. A very esthetic fence is obtained.

What is claimed is:

1. A wire stretcher for stretching wires, or ropes, in particular for use in fences, or drying racks, characterized in that the wire stretcher (1) comprises a yoke (7) to be attached to a post (3), whereby the outer end portions of the yoke (7) are provided with two opposite apertures (8) and (9) wherein a rotatable stretching element (10) is disposed, which stretching element (10) is provided with a through cross-aperture (11) in which a wire to be stretched can be secured and with a threaded outer end (12) and an associated nut (13), whereby the cross-section of the threaded outer end (12) is smaller than the cross-section of the stretching element (10) itself and substantially equal to the cross-sectoon of the aperture (9) in one outer end portion of the yoke (7), so that, by tightening the nut (13), this outer end portion of the yoke (7) is gripped between the collar of the stretching element (10) and the nut (13).

2. A wire stretcher according to claim 1, characterized in that the yoke (7) is excentrically bent.

* * * * *